(No Model.)

C. T. CHILD.
ALTERNATING CURRENT MOTOR.

No. 528,121. Patented Oct. 23, 1894.

Witnesses:

Inventor,
Charles T. Child

UNITED STATES PATENT OFFICE.

CHARLES T. CHILD, OF ASHLAND, VIRGINIA, ASSIGNOR TO THE ELECTRIC POWER COMPANY, OF MAINE.

ALTERNATING-CURRENT MOTOR.

SPECIFICATION forming part of Letters Patent No. 528,121, dated October 23, 1894.

Application filed December 22, 1893. Serial No. 494,392. (No model.)

*To all whom it may concern:*

Be it known that I, CHARLES TRIPLER CHILD, of Ashland, in the county of Hanover and State of Virginia, have invented a new and useful Alternating-Current Motor, of which the following is a specification, reference being had to the accompanying drawings, making a part hereof, in which—

Figure 1:
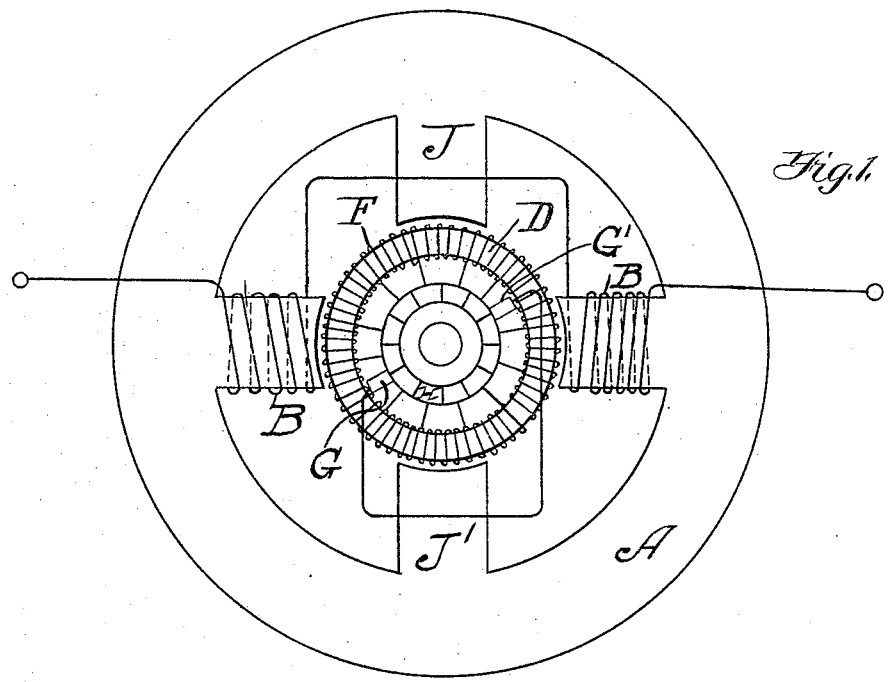
Figure 2:
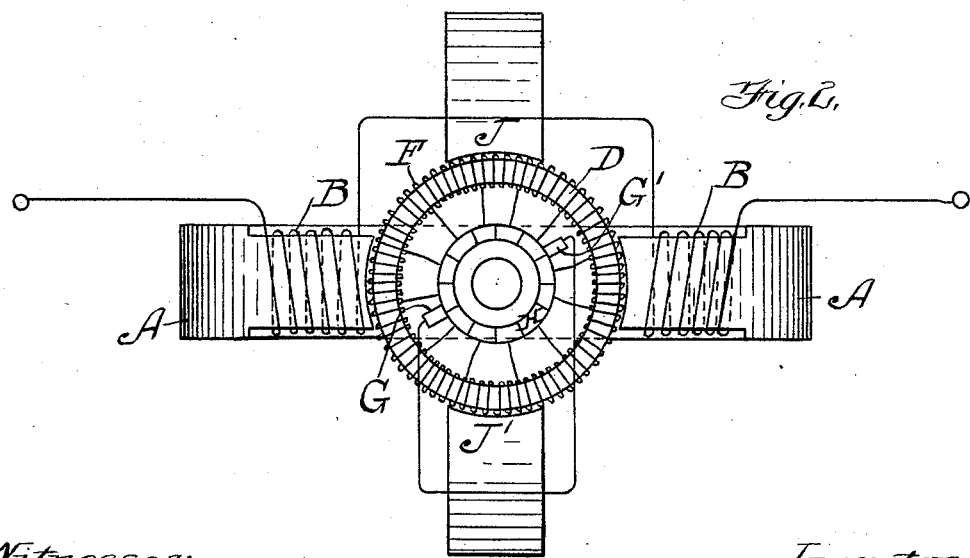

Figure 1 illustrates one form of my invention, and Fig. 2 illustrates a modification.

It has long been known that when two coils were in proper relation to a magnetic circuit an alternating current in one would induce an alternating current in the other, and motors on this principle have been devised, the field magnet coils being commonly the primary coil, or the coil carrying the impressed current, and the armature coils the secondary coil, or the coil carrying the induced current, but such motors are practically worthless because of their lack of efficiency; that is only a small per cent. of the power expended in generating the impressed current can be given out by the motor. The apparently insuperable difficulty with all such motors is that the induced current is necessarily altogether too great in quantity if the resistance of the armature coils is as small, as it must be practically; for in order to attain any approach to a commercial efficiency the difference of potential between the terminals of the primary coil multiplied by the ampères in that coil, must nearly equal the difference of potential between the terminals of the secondary circuit multiplied by the ampères in that circuit; and if the ampères in the secondary circuit be cut down by a resistance which is extraneous to the armature coil forming part of the secondary circuit the result is excessive waste of energy; and it is wholly unpractical to make the armature coil so that it shall have in itself sufficient resistance.

My invention is a motor in which the secondary coils are in close relation with one or more masses of iron between the poles of the field magnet, as will now be explained by reference to the drawings.

A represents the field magnet; B, its coils; D, the armature core, and F its coils. The coils B are in circuit with a generator of alternating currents, and therefore are in this case the primary coils. The coils F form two loops of a closed circuit in the manner familiar in all closed circuit armatures; for the brushes G G' rest upon plates of the commutator H, and the contiguous ends of any two contiguous coils go to the same plate of the commutator, so that the current splits at the brushes one-half flowing through part of the coils the other half through the other part of the coils, as will be clear without further description. The coils B are, of course, wound to produce opposite salient poles, and hence the projections J J', shown in Fig. 1 are not consequent poles, and must be without polarity to serve their function, except that polarity due to induction from the armature coils. It will also be clear that the adjustment of the brushes G G' will determine the direction of rotation of the armature; and, indeed, up to this point I have described nothing more than has long since been suggested but which is wholly inoperative, for were it not for the masses of iron J J', the current in coils B, and the current induced in the armature coils F would soon heat them sufficiently to destroy their insulation, and make the machine worthless. This will be clear if it be assumed that there are one hundred turns in the field coils B, and a like number in the armature coils F, and that a constant difference of potential of fifty volts be maintained between the terminals of the field coils, and if it also be assumed that the wire used in the coils B and F be so small that it will have about one ohm resistance, and that it will not bear more than five ampères of current without becoming unduly heated. Under these assumptions the current in the coils B and F would be nearly fifty ampères if the armature did not rotate, and if the bodies J J' were absent; and although the rotation of armature D will diminish the current in coils B and F materially, it is practically impossible for armature D to attain the very high speed necessary to diminish the current in coils B and F sufficiently to prevent excessive heating of these coils. If the length of wire in coils F be increased, to increase the resistance, the difference of potential between the terminals of coils F will also be increased, as there will necessarily be more turns or spires in coils F; and if the diameter of the wire in coils F be decreased, to increase the resistance, the wire will be too small to carry the desired current.

I have discovered that if masses of iron J J' be used between the poles N S of the field magnet, as indicated in the drawings, the current in coils F and B will be reduced so that when the desired speed of rotation is reached the coils will not be unduly heated, and what is still more important the efficiency of the motor will be high.

My theory is that the self induction of those of the coils F which are between the core D of the armature and the masses J J' of iron is so greatly increased as to cut down the current flowing in the coils B and F.

I find in practice that it is not essential that the masses of iron J J' be connected with the field magnet A; as they may be separated by a wide air gap from magnet A as shown in Fig. 2.

Whatever may be the correct theory the fact is that the addition of the iron masses J J' cuts the current down in the coils B and F, and makes any extraneous resistance in circuit with coils F unnecessary and also converts a machine which would be self destructive and wholly worthless without the masses J J', into an alternating current motor of marked efficiency at usual speeds.

I have shown masses of iron J and J' diametrically placed with reference to the armature, but obviously one mass will answer a good purpose, although the diametrical position is better.

Another advantage of my invention is that I am able by reason of the use of masses of iron J J' as above described to make the number of turns in the armature coils F several times greater than the number of turns in the field coils B; thereby greatly increasing the torque, and decreasing the requisite speed of the armature to give the best results.

In a small motor with a difference of potential of fifty volts between the terminals of the field coils B, and a total of about two hundred turns in both field coils, I have used over four hundred turns in the armature coils; the brushes being connected by a conductor of trifling resistance; so that the total resistance of the field coils was less than one ohm, and the total resistance of the secondary circuit, the armature coils, commutator brushes and conductor short circuiting the brushes, about two ohms; and under these conditions the current in the field coils was about three ampères when the armature had a speed of about two thousand per minute; the current in the armature coils being about one and a half ampères.

It will now be clear that I do not claim a motor comprising a field and an armature, with a commutator and brushes electrically connected to close the secondary circuit through the armature coils nor do I claim a field magnet with salient and consequent poles; but

What I claim as my invention is—

An alternating current motor consisting of a field magnet with alternating and opposite poles; a closed circuit armature and its core with alternating and opposite poles; a commutator, and its brushes short circuiting the armature coils; and masses of iron J J' between the alternating and opposite poles of the field magnet, to reduce the current which is induced in the armature coils by the alternating current in the field coils substantially as set forth.

CHARLES T. CHILD.

Witnesses:
J. E. MAYNADIER,
JOHN R. SNOW.